United States Patent
Ouyang

(10) Patent No.: US 8,400,129 B2
(45) Date of Patent: Mar. 19, 2013

(54) ADAPTIVE CONSTANT ON-TIME SWITCHING REGULATOR

(75) Inventor: Qian Ouyang, Hangzhou (CN)

(73) Assignee: Monolithic Power Systems, Inc., San Jose, CA (US)

( * ) Notice: Subject to any disclaimer, the term of this patent is extended or adjusted under 35 U.S.C. 154(b) by 763 days.

(21) Appl. No.: 12/603,455

(22) Filed: Oct. 21, 2009

(65) Prior Publication Data

US 2010/0134080 A1 Jun. 3, 2010

(30) Foreign Application Priority Data

Oct. 21, 2008 (CN) .......................... 2008 1 0046332

(51) Int. Cl.
*G05F 1/40* (2006.01)
*G05F 1/56* (2006.01)

(52) U.S. Cl. .................. 323/283; 323/271; 323/285

(58) Field of Classification Search .................. 323/222, 323/223, 225, 268, 271, 282–286
See application file for complete search history.

(56) References Cited

U.S. PATENT DOCUMENTS

| | | | | |
|---|---|---|---|---|
| 5,818,214 A * | 10/1998 | Pelly et al. | ..................... | 323/351 |
| 6,121,760 A * | 9/2000 | Marshall et al. | ............... | 323/282 |
| 7,492,133 B2 * | 2/2009 | Yoshikawa | ..................... | 323/222 |
| 7,952,339 B2 * | 5/2011 | Sakamoto | ..................... | 323/285 |
| 2011/0031948 A1 * | 2/2011 | Chien et al. | .................... | 323/282 |

* cited by examiner

*Primary Examiner* — Matthew Nguyen
(74) *Attorney, Agent, or Firm* — Perkins Coie LLP

(57) ABSTRACT

The present invention provides an adaptive constant on-time switching regulator which comprises a switching circuit, a control circuit, and an output circuit. The control circuit controls the switches in the switching circuit to be turned on for an adaptive constant time, and be turned off for a minimum time.

8 Claims, 6 Drawing Sheets

ADAPTIVE CONSTANT ON-TIME SWITCHING REGULATOR

PRIORITY CLAIM

This application claims the benefit of the filing date of Chinese application Ser. No. 200810046332.8, filed on Oct. 21, 2008, which is incorporated herein by reference in its entirety.

TECHNICAL FIELD

The present invention relates to switching regulators, and more particularly, the present invention relates to adaptive constant on-time switching regulators.

BACKGROUND

There are several control methods used in switching regulators, two of which are voltage mode control and current mode control. However, these two control modes need an error amplifier to amplify the difference between the sensed output voltage and a reference level. This complicates the internal structure of the regulator. Further, the two control modes need an additional compensation circuit to achieve system stability. In addition, the transient response is influenced by the system bandwidth, which may lead to low transient response.

Therefore, there is a need to provide a switching regulator which achieves a fast transient response with a simple structure and without the need for a compensation circuit.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Figure 1:
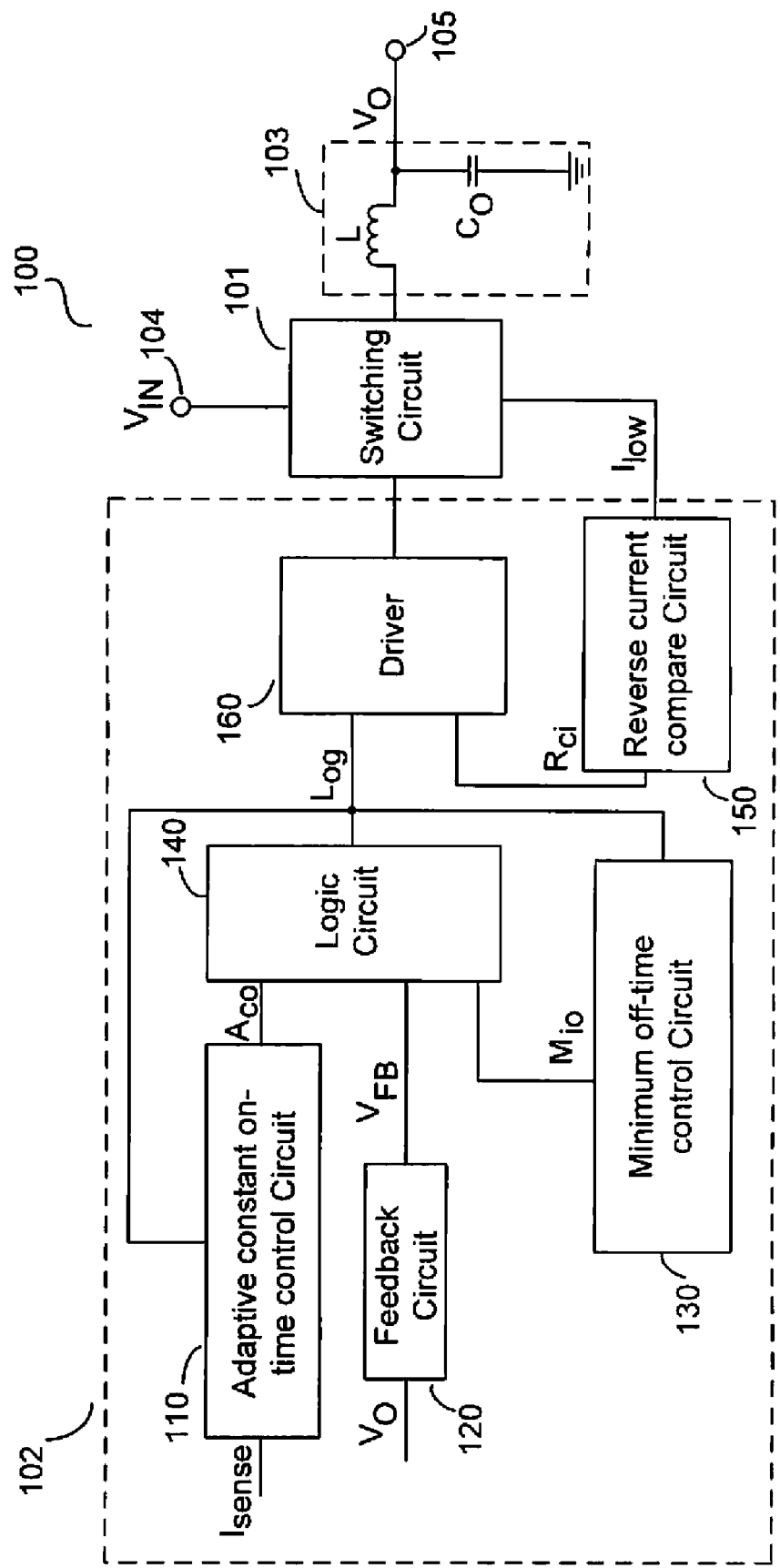
FIG. 1 illustrates an adaptive constant on-time switching regulator 100.

Referring to FIG. 1, an adaptive constant on-time switching regulator 100 in accordance with an embodiment of the present invention is illustrated. As shown in FIG. 1, switching regulator 100 includes an input terminal 104, an output terminal 105, a switching circuit 101 coupled to the input terminal 104, a control circuit 102 coupled to switching circuit 101, and an output circuit 103 coupled between switching circuit 101 and the output terminal 105.

In one embodiment, output circuit 103 comprises an inductor L, and an output capacitor CO. The inductor L is coupled to the output terminal 105. The output capacitor CO is coupled between the output terminal 105 and ground.

In one embodiment, control circuit 102 comprises an adaptive constant on-time control circuit 110, a feedback circuit 120, a minimum off-time control circuit 130, a logic circuit 140, a reverse current compare circuit 150, and a driver 160.

In one embodiment, when in operation, adaptive constant on-time control circuit 110 provides an adaptive constant on-time signal Aco in response to a current sense signal Isense, which represents the rising period part of the inductor current IL through inductor L, and a logical signal Log output from logic circuit 140. Feedback circuit 120 is coupled to the output terminal 105, for receiving the output signal VO, and providing a feedback signal VFB to logic circuit 140. Minimum off-time control circuit 130 receives the logical signal Log output from logic circuit 140, and provides a minimum off-time signal Mio to logic circuit 140. The logical signal Log is also sent to driver 160 by logic circuit 140 in response to the adaptive constant on-time signal Aco, the feedback signal VFB, and the minimum off-time signal Mio.

Reverse current compare circuit 150 receives a signal Ilow representing the falling period part of inductor current IL, and provides a reverse current indicating signal Rci to driver 160. Driver 160 provides driving signals to switching circuit 101 in response to the logical signal Log and the reverse current indicating signal Rci, so as to control switches in switching circuit 101 to be on for an adaptive constant time, and off for a constant (minimum) time.

Figure 2:
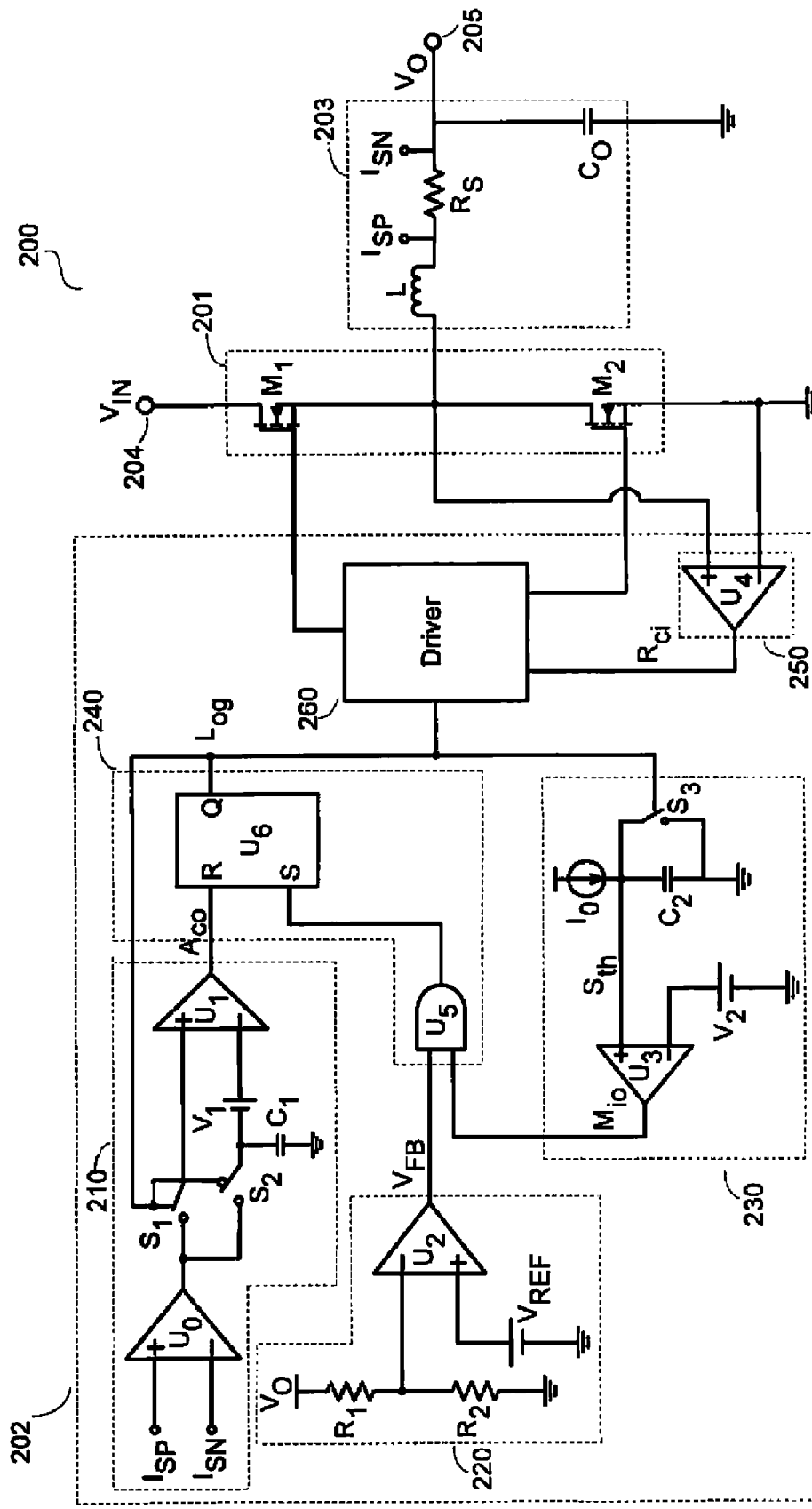
FIG. 2 illustrates an adaptive constant on-time switching regulator 200 in accordance with another embodiment of the present invention.

FIG. 2 shows an adaptive constant on-time switching regulator 200 in accordance with another embodiment of the present invention. As shown in FIG. 2, switching regulator 200 comprises an input terminal 204, an output terminal 205, a switching circuit 201 coupled between the input terminal 204 and ground, a control circuit 202 coupled to switching circuit 201, and an output circuit 203 coupled between switching circuit 201 and ground. In one embodiment, switching circuit 201 is a buck circuit, i.e., it comprises a high-switch M1 and a low-side switch M2 coupled in series between the input terminal 204 and ground. The series coupled terminal is coupled to the output terminal 205 via output circuit 203. In one embodiment, the high-side switch M1 and the low-side switch M2 are N-channel MOSFETs. However, in other embodiments, the switching circuit 201 may be any desired switching circuit, such as a boost, buck/boost, forward, flyback, etc. Switches M1 and M2 are not limited to N-channel MOSFETs—they may be other switches such as P-channel MOSFETs, IGBTs, transistors, etc.

In one embodiment, control circuit 202 comprises an adaptive constant on-time control circuit 210, a feedback circuit 220, a minimum off-time control circuit 230, a logic circuit 240, a reverse current compare circuit 250. In one embodiment, control circuit 202 further comprises a driver 260.

In one embodiment, output circuit 203 comprises an inductor L, a current sense resistor RS, and an output capacitor CO. The inductor L is coupled to the current sense resistor RS in series between switching circuit 201 and the output terminal 205. The output capacitor CO is coupled between the output terminal 205 and ground.

In one embodiment, adaptive constant on-time control circuit 210 comprises a current sense amplifier U0, a first switch S1, a second switch S2, a first comparator U1, a first DC supply V1, and a first capacitor C1. The non-inverting input terminal of the current sense amplifier U0 is coupled to the inductor side terminal of the current sense resistor RS. The inverting input terminal of the current sense amplifier U0 is coupled to the other terminal of the current sense resistor RS, for receiving the rising period part of inductor current IL. FIG. 2 only shows the current sense resistor RS series coupled with the inductor L. However, the current sense resistor could be a certain resistor in the current flowing loop when the inductor current IL is rising. In other words, the sense resistor RS series may be coupled with the inductor L, or RDS-ON of the high-side switch M1, or a sense resistor that is coupled in series with the high-side switch M1, etc. In addition, the two input terminals of the current sense amplifier U0 could also be coupled to those who can reflect the rising period part of the inductor current IL.

The output terminal of the current sense amplifier U0 is coupled to the non-inverting input terminal of the first comparator U1 via the first switch S1, and coupled to the inverting input of the first comparator U1 via the second switch S2 and the first DC supply V1. The first capacitor C1 is coupled to the inverting input terminal of the first comparator U1 via the first DC supply V1. The output of the current sense amplifier U1 is the adaptive constant on-time signal Aco, which is provided to logic circuit 240. The control terminals of the first switch S1 and the second switch S2 are coupled together to the output terminal of logic circuit 240. In one embodiment, the first switch S1 and the second switch S2 are turned on and off complementary.

In one embodiment, voltage feedback circuit 220 comprises a divider, a second comparator U2, and a reference VREF coupled as shown. The divider is coupled to the output terminal 205, for receiving the output signal of the switching regulator 200. The second comparator U2 is coupled to the divider at its inverting input terminal, for receiving a divided signal Vdi, and coupled to the reference VREF at its non-inverting input, and provides the feedback signal VFB at its output terminal. In one embodiment, the divider includes a first resistor R1 and a second resistor R2 coupled in series, wherein the second resistor R2 is optional. However, the divider may also be a slide rheostat, an adjustable resistor or other bleeder circuits.

In one embodiment, minimum off-time control circuit 230 comprises a sawtooth generator, a third comparator U3, and a second DC supply V2 coupled as shown. The sawtooth generator is coupled to logic circuit 240 for receiving the logical signal Log, and provides a sawtooth signal Sth. The third comparator U3 is coupled to the sawtooth generator at its non-inverting input terminal for receiving the sawtooth signal Sth, coupled to the second DC supply V2 at its inverting input terminal, and provides the minimum off-time signal Mio at its output terminal. In one embodiment, the sawtooth generator comprises a current source I0, a second capacitor C2, and a third switch S3. The output terminal of the current source I0 is coupled to the non-inverting input terminal of the third comparator U3. The second capacitor C2 and the third switch S3 are coupled in parallel between the non-inverting input terminal of the third comparator U3 and ground. The control terminal of the third switch S3 is coupled to logic circuit 240 for receiving the logical signal Log.

In one embodiment, logic circuit 240 comprises an AND gate U5 and a RS trigger U6. The two input terminals of the AND gate U5 are coupled to the output terminals of feedback circuit 220 and minimum off-time control circuit 230, respectively. The output terminal of the AND gate U5 is coupled to the set terminal S of the RS trigger U6. The RS trigger U6's reset terminal R is coupled to the output terminal of adaptive constant on-time control circuit 210. The RS trigger U6 provides the logical signal Log at its output terminal Q, which is sent to adaptive constant on-time control circuit 210, to minimum off-time control circuit 240, and to driver 260.

In one embodiment, reverse current compare circuit 250 comprises a fourth comparator U4 which has its two input terminals coupled across the low-side switch M2 in parallel, so that the falling period part of the inductor current IL is sensed by the fourth comparator U4. The output of the fourth comparator U4 is a reverse current indicating signal Rci, which is sent to driver 260.

In one embodiment, driver 260 provides two driving signals to the control terminals of the high-side switch M1 and the low-side switch M2, respectively, to control the on and off status of the two switches. Driver 260 may be any desired driver circuit, details of which are omitted to avoid obscuring the invention. Furthermore, the number of the driven signals provided by driver 260 is determined by the number of the switches in switching circuit 201.

Figure 3:
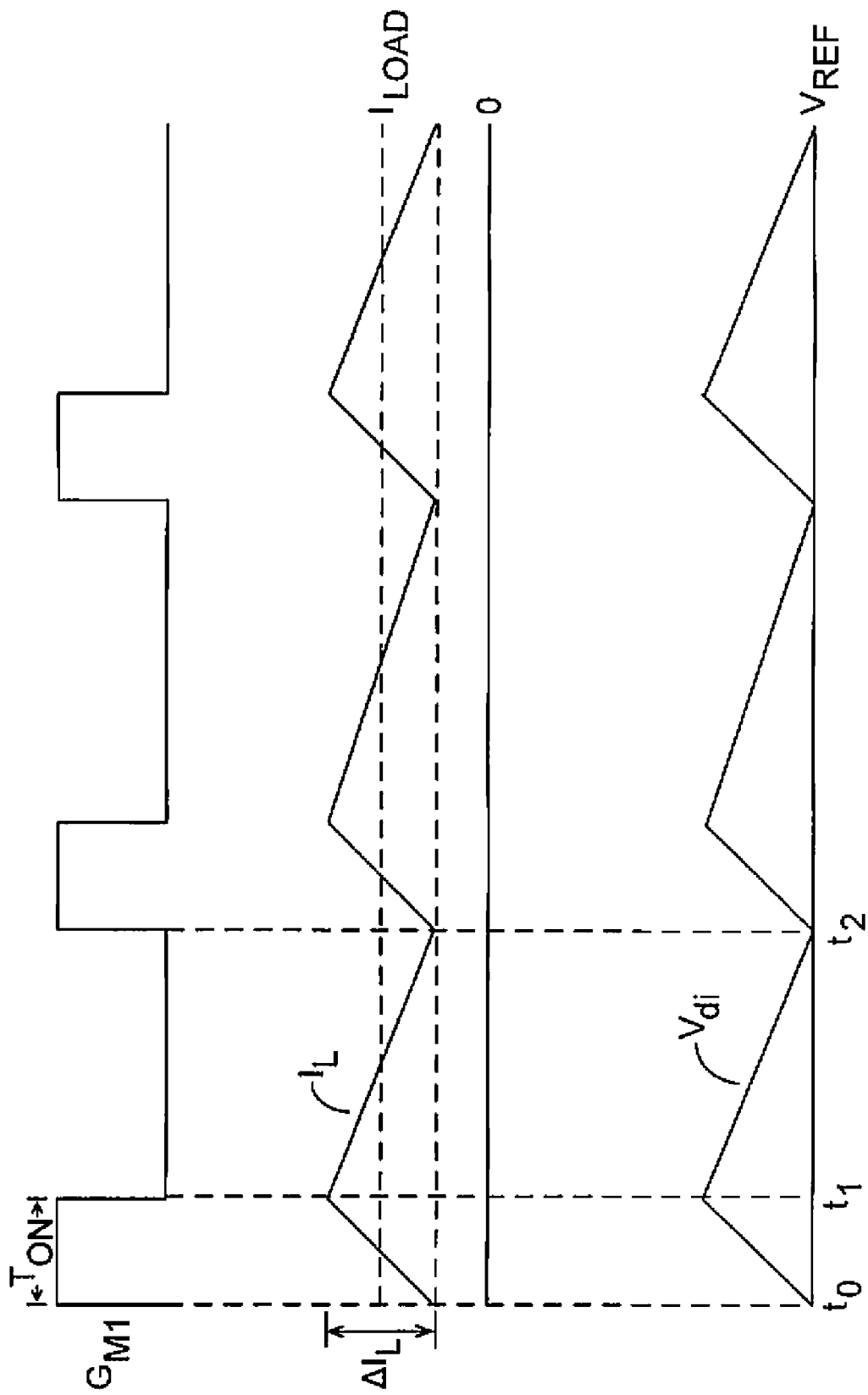
FIG. 3 illustrates waveforms when switching regulator 200 is at heavy load condition.

Referring to FIG. 3, waveforms when switching regulator 200 is at heavy load condition are depicted. As shown in FIG. 3, at time t0, the driving signal of the high-side switch GM1 is high, namely, the logical signal Log is high, the high-side switch M1 is turned on accordingly. The first switch S1 and the third switch S3 are turned on, the second switch S2 is turned off accordingly. Thus the output terminal of the current sense amplifier U0 is coupled to the non-inverting input terminal of the first comparator U1 directly. In the meantime, in minimum off-time control circuit 230, the electric charge of the second capacitor C2 is discharged quickly, causing the voltage at the non-inverting input terminal of the third comparator U3 to be lower than that at its inverting input terminal. The minimum off-time signal Mio is low accordingly. In addition, in switching circuit 201, the input VIN, the high-side switch M1, the inductor L, the current sense resistor RS, and the output capacitor CO form a current loop. The inductor current IL and the output voltage VO are increased, causing the divided signal Vdi to be increased as well. When it is higher than the reference VREF, the feedback signal VFB turns low. As a result, the output of the AND gate U5 is low.

When the inductor current IL (equals to the current flowing through the high-side switch M1 during this period) is increased to a certain value, the voltage at the non-inverting input terminal of the first comparator U1 is higher than that at its inverting input terminal. Thus the adaptive constant on-time signal Aco is high, causing the output Q of the RS trigger U6, i.e., the logical signal Log to be reset low. On the one hand, the low logical signal Log turns off the first switch S1 and third switch S3, and turns on the second switch S2. Thereupon the output terminal of the current sense amplifier U0 is coupled to the first capacitor C1 and the first DC supply V1 directly. In the meantime, in minimum off-time control circuit 230, the current source I0 recharges the second capacitor C2. The voltage across the second capacitor C2 is increased linearly. When it is higher than the second DC supply V2, the minimum off-time signal Mio turns high. On the other hand, the logical signal Log turns off the high-side switch M1, and turns on the low-side switch M2 via driver 260. This is at time t1, when TON is just over. From time t1, the low-side switch M2, the inductor L, the current sense resistor RS, and the output capacitor CO form a current loop. The inductor current IL and output voltage VO are decreased, causing the voltage at the divided signal Vdi to be decreased as well. When it is lower than the reference VREF, the feedback voltage VFB turns high.

When both the feedback voltage VFB and the minimum off-time signal Mio are high, the output of the AND gate U5 is high, causing the logical signal Log to be high. The high logical signal Log turns on the high-side switch M1, and turns off the low-side switch M2. This is at time t2. During time t1 to time t2, the output of the current sense amplifier U0 is coupled to the first capacitor C1 directly. The voltage across the first capacitor C1 simultaneously reflects the current flowing through the high-side switch M1. So the voltage at the inverting input terminal of the first comparator U1 is the sum of the sensed inductor current IL and the voltage of the first DC supply V1. During time t0 to time t1, the inductor current IL is increased to a certain value, the adaptive constant on-time signal Aco turns high. The certain value herein is Iinitial+ΔIL, wherein Iinitial is the inductor current value right when the high-side switch M1 is turned on from off status, while ΔIL is the inductor current ripple. During the rising period of the inductor current, since the first capacitor C1 can hold the voltage, i.e., the voltage across the first capacitor C1 keeps constant, the voltage across the first capacitor C1 represents Iinitial. So the inductor current ripple ΔIL is corresponding to the voltage of the first DC supply V1. As a result, if the voltage of the first DC supply V1 is selected, the inductor current ripple ΔIL is fixed. Whereas the on time of the high-side switch M1 TON is determined by the input voltage, the output voltage, the inductor current ripple ΔIL, and the inductance of the inductor L. After the inductance of the inductor L are determined, the on time of the high-side switch M1 TON is constant with a given input voltage VIN and a given output voltage VO, and has corresponding values with different input voltages and output voltages. Thus switching regulator 100/200 realizes adaptive constant on time control. From time t2, switching regulator 200 enters a new cycle, the operation is same to that described hereinbefore. Since switching regulator 200 is at heavy load condition during this process, there is no reverse current in switching circuit 201. Thus reverse current compare circuit 250 takes no action.

Figure 4:
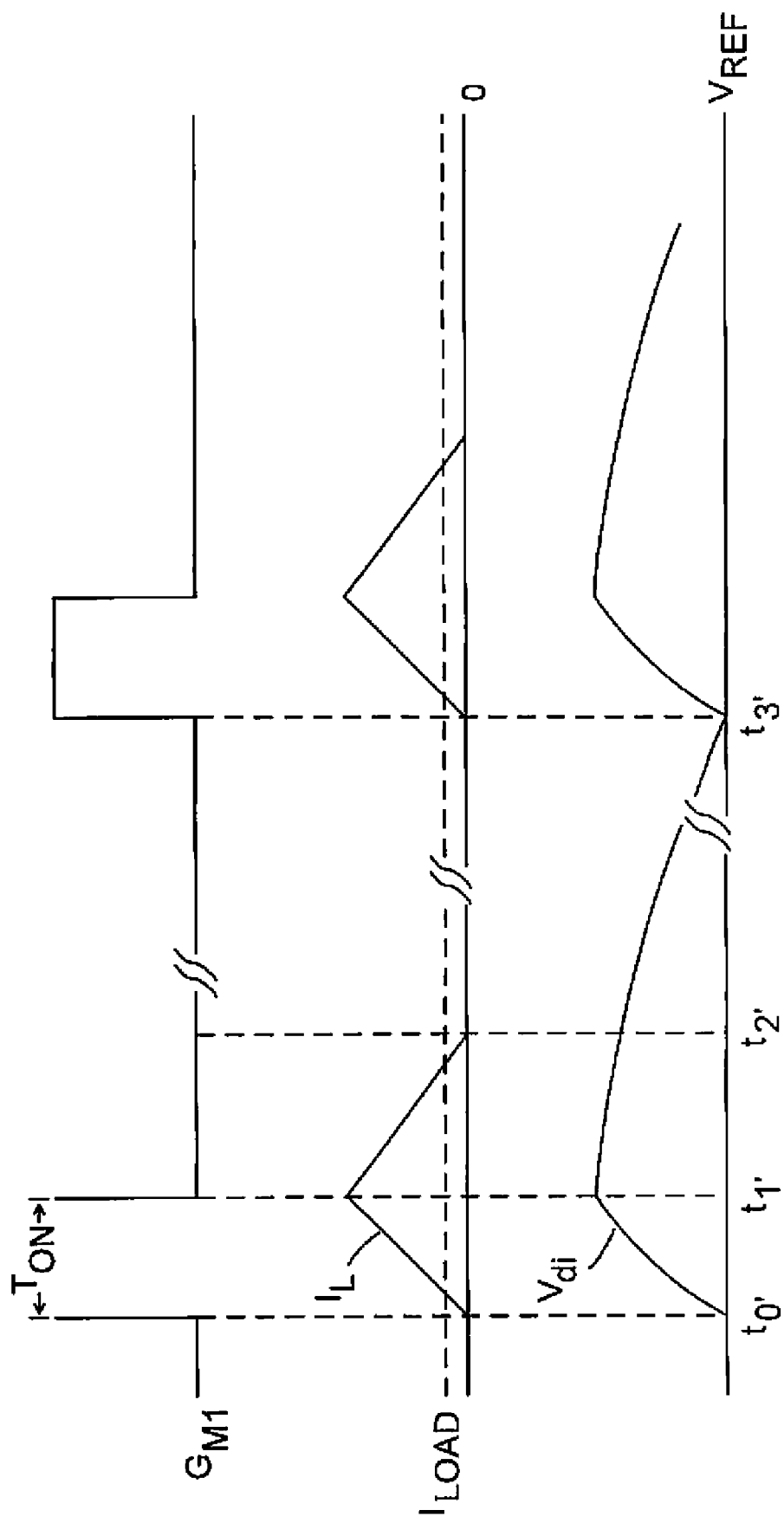
FIG. 4 illustrates waveforms when switching regulator 200 is at light load condition.

Referring to FIG. 4, waveforms when switching regulator 200 is at light load condition are depicted. As shown in FIG. 4, at time t0', the high-side switch M1 is turned on, the low-side switch M2 is turned off. At time t1', the high-side switch M1 is turned off, the low-side switch M2 is turned on. During time t0' to time t1', the operation at light load condition shown in FIG. 4 is same to that in FIG. 3, which will not be illustrated herein. From time t1', the inductor current IL and the output voltage V0 are decreased. Since switching regulator 200 is at light load condition, the driving signal of the high-side switch GM1 is low during the succedent cycles. Until time t2', the inductor current IL is decreased to zero, the high-side switch M1 is still off. Then the output of the fourth comparator U4, i.e., the reverse current indicating signal Rci turns low. This low reverse current indicating signal Rci turns off the low-side switch M2 via driver 260. The operation of driver 260 is conventional. From time t2', the high-side switch M1 and the low-side switch M2 are both turned off, switching regulator 200 enters a power-skipping mode. The output capacitor CO supplies power to the output (such as a load). Until time t3', the output voltage VO is still decreased, which causes the voltage at the divided signal Vdi to be lower than the reference VREF. The feedback signal VFB turns high accordingly. The voltage across the second capacitor C2 was charged to be higher than the second DC supply V2, so the minimum off-time signal Mio goes high. As a result, the output of the AND gate U5 is high at time t3', which causes the output Q of the RS trigger U6 to be set high, i.e., the logical signal Log turns high. This high logical signal Log turns on the high-side switch M1 via driver 260. Switching regulator 200 enters a new cycle, the operation of which is same to that described hereinbefore. During this light load process, when zero inductor current is detected by reverse current compare circuit 250, driver 260 turns off the low-side switch M2 immediately, forcing switching regulator 200 to enter the power-skipping mode. As a result, the switching frequency is decreased, and the switching loss is reduced which improves the efficiency.

Figure 5:
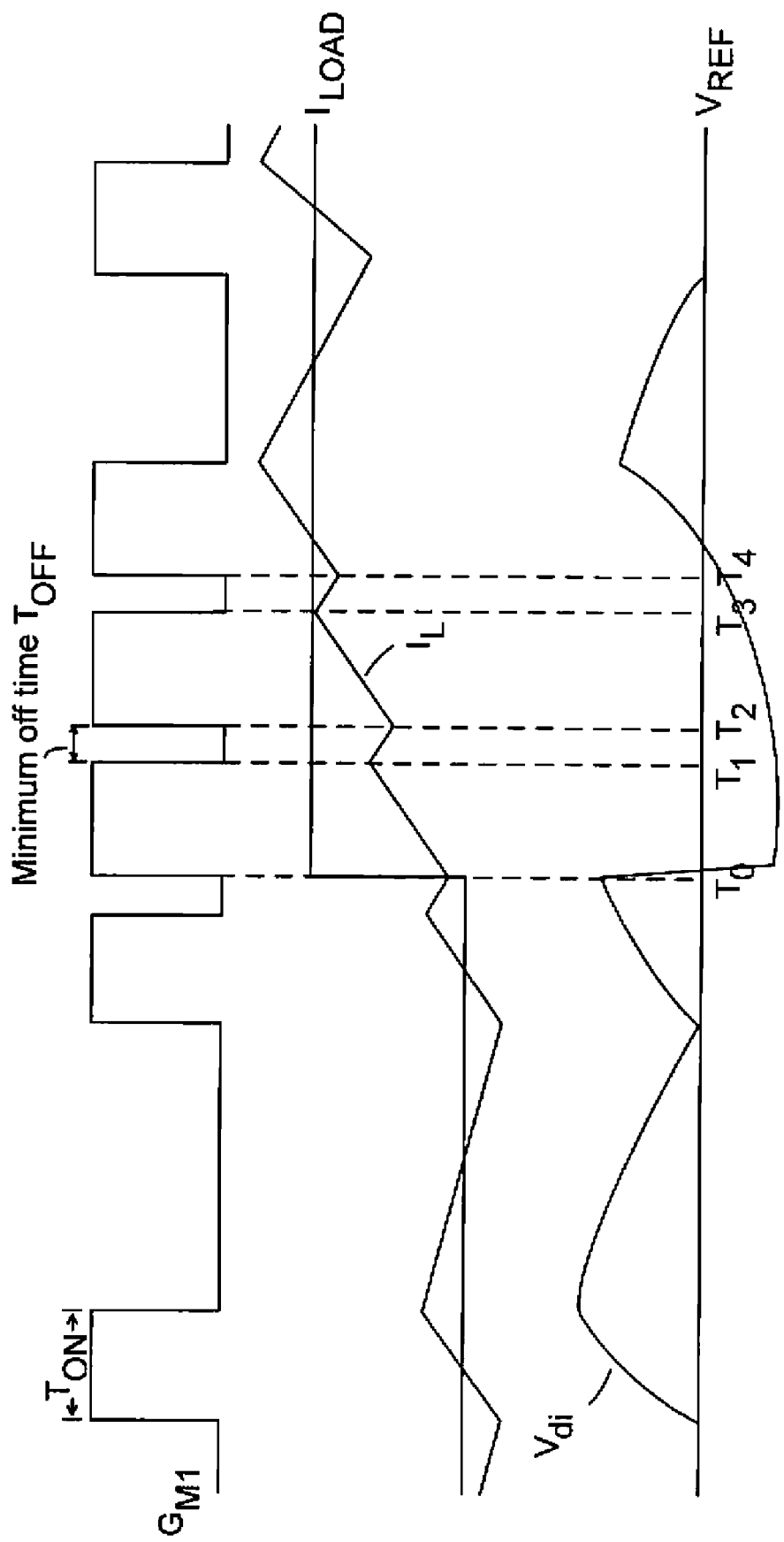
FIG. 5 illustrates waveforms when switching regulator 200 moves to a light load from a heavy load.

Referring to FIG. 5, waveforms when switching regulator 200 moves to heavy load from light load are depicted. As shown in FIG. 5, before time T0, switching regulator 200 is at light load condition. At time T0, the load current ILOAD skips to high, causing the output voltage VO to be dropped quickly. The divided signal Vdi is dropped to be lower than the reference VREF. Thereupon the feedback signal VFB turns high. In minimum off-time control circuit 240, the second capacitor C2 is charged by the current source I0, in order to increase the voltage across the second capacitor C2, i.e. the sawtooth signal Sth to be higher than the voltage of the second DC supply V2. So that the minimum off-time signal Mio turns high. From the time that logical signal Log turns low, the third switch S3 is turned off accordingly, there is a time period needed to let the sawtooth signal Sth be higher than the voltage of the second DC supply V2. During this time period, the minimum off-time signal Mio is low, causing the output of the AND gate U5 to be low regardless of the feedback signal VFB is high or low. Thereupon the logical signal Log keeps low status, and the high-side switch M1 keeps off. This time period is called high-side switch's minimum off time TOFF. As shown in FIG. 5, at time T0, time period TOFF has passed, the output of the AND gate U5 turns high, causing the logical signal Log to be high. The high logical signal Log turns on the high-side switch M1, and turns off the low-side switch M2 via driver 260. The inductor current IL and the output voltage VO begin to be increased. After time period TON, i.e., at time T1, the output of the first comparator U1, i.e. the adaptive constant on-time signal Aco turns high, causing the logical signal Log to be reset low. The low logical signal Log turns off the high-side switch M1. Whereas as shown in FIG. 5, the divided signal Vdi is still lower than the reference VREF, the feedback voltage VFB is high accordingly. During the time period from time T1 to time T2, the sawtooth signal Sth is slowly increased to higher than the voltage of the second DC supply V2. At time T2, the minimum off-time signal Mio turns high, causing the logical signal Log to be set high. This high logical signal Log turns on the high-side switch M1, and turns off the low-side switch M2 via driver 260. Switching regulator 200 enters next time period TON. Until time T3, time period TON is over, the high-side switch M1 is turned off, and the low-side switch M2 is turned on. Switching regulator 200 enters next time period TOFF. Until time T4, time period TOFF is over, the high-side switch M1 is turned on, the low-side switch M2 is turned off, switching regulator 200 reenters a time period TON. As shown in FIG. 5, during this time period TON, the divided signal Vdi is increased to higher than the reference VREF. Until now, switching regulator 200 totally enters heavy load mode. The transient load skip is over, the subsequent operation of switching regulator 200 is as shown in FIG. 3, which will not be repeated here. Once the load skips from light load condition to heavy load condition, the output voltage VO is dropped quickly, causing the divided signal Vth to be lower than the reference VREF. As a result, the high-side switch is turned on immediately, and the transient respond is very fast.

Figure 6:
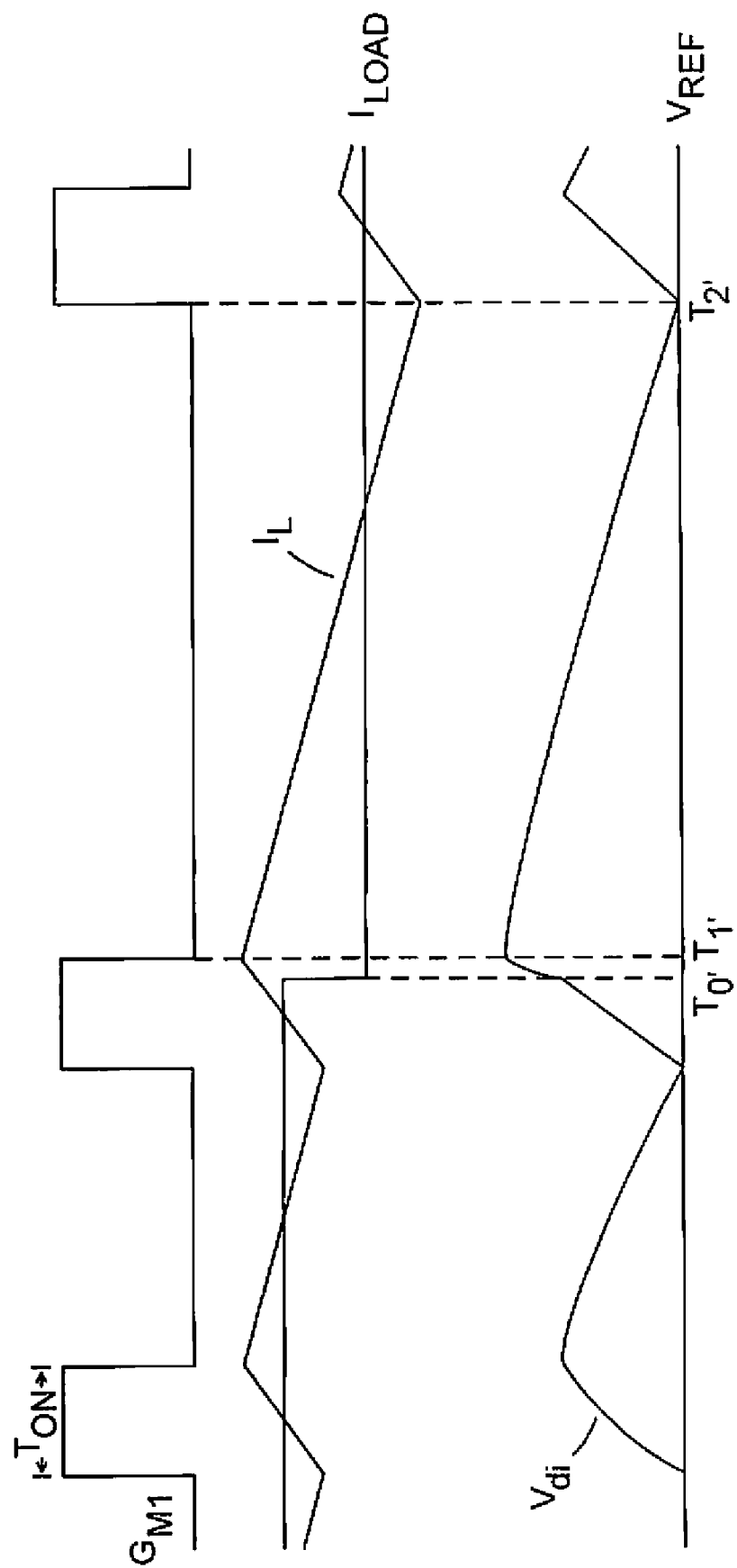
FIG. 6 illustrates waveforms when switching regulator 200 moves to a heavy load from a light load.

Referring to FIG. 6, waveforms when switching regulator 200 moves to light load from heavy load is shown. As shown in FIG. 6, before time T0', switching regulator 200 is at heavy load condition. At time T0', the load current ILOAD skips to low, causing the output voltage VO to be increased quickly. The divided signal Vdi is increased accordingly, and it keeps higher than the reference VREF in a period of time. Thereupon the feedback signal VFB is low, the output Q of the RS trigger U6, i.e., the logical signal Log keeps low as well. Thus after time period TON, i.e., at time T1', the driving signal of the high-side switch GM1 turns low, the high-side switch M1 is turned off, and keeps off for a period of time. The inductor current IL and the output voltage VO are decreased, causing the divided signal Vdi to be decreased. Until time T2', the divided signal Vdi is lower than the reference VREF. Thereupon, the feedback signal VFB turns high. The time period from time T1' to time T2' is much longer than the time period TOFF. Thus the minimum off-time signal Mio is high at time T2', causing the logical signal Log to be set high. The high logical signal Log turns on the high-side switch M1 via driver 260. Switching regulator 200 totally enters light load mode. The transient load skip is over, the subsequent operation of switching regulator 200 is as shown in FIG. 4, which will not be repeated.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

I claim:

1. An adaptive constant on-time switching regulator, comprising:
    an input terminal operable to receive an input signal;
    an output terminal operable to provide an output signal;
    a switching circuit coupled to the input terminal;
    an output circuit coupled between the switching circuit and the output terminal,
    wherein the output circuit comprises:
    an inductor coupled between the switching circuit and the output terminal;
    an output capacitor coupled between the output terminal and ground;
    and
    a control circuit, coupled to the switching circuit, operable to control switches in the switching circuit to be turned on for an adaptive constant time, and be turned off for a minimum time, wherein the control circuit comprises:
    an adaptive constant on-time control circuit, operable to receive a logical signal and a current sense signal representing the inductor current on the rising period part of the inductor current, the control circuit providing an adaptive constant on-time signal;
    a feedback circuit, coupled to the output terminal, operable to receive the output signal and provide a feedback signal;
    a minimum off-time control circuit, operable to receive the logical signal and provide a minimum off-time signal;
    a logic circuit, coupled to the adaptive constant on-time control circuit, for receiving the adaptive constant on-time signal, the logic circuit coupled to the feedback circuit, for receiving the feedback signal, the logic circuit coupled to the minimum off-time control circuit, for receiving the minimum off-time signal, the logic circuit operable to provide the logical signal;
    a reverse current compare circuit, operable to receive a signal representing the inductor current on the falling period part of the inductor current, and provide a reverse current indicating signal; and
    a driver, coupled to the logic circuit, for receiving the logical signal; the driver coupled to the reverse current compare circuit, for receiving the reverse current indicating signal; the driver operable to provide a driving signal to the switching circuit to control the switches in the switching circuit to be turned on for an adaptive constant on time, and be turned off for a minimum off time.

2. The adaptive constant on-time switching regulator as set forth in claim 1, wherein the output circuit further comprises a current sense resistor coupled to the inductor in series.

3. The adaptive constant on-time switching regulator as set forth in claim 2, wherein the adaptive constant on-time control circuit further comprises:
    a current sense amplifier, a first switch, a second switch, a first comparator, a first DC supply, and a first capacitor, wherein the two input terminals of the current sense amplifier are coupled across the current sense resistor, the output terminal of the current sense amplifier is coupled to the non-inverting input terminal of the first comparator via the first switch, the output terminal of the current sene amplifier is also coupled to the inverting input of the first comparator via the second switch and the first DC supply;
    further wherein the first capacitor is coupled to the inverting input terminal of the first comparator via the first DC supply;
    further wherein the control terminals of the first switch and said second switch are coupled together to the output terminal of said logic circuit for receiving the logical signal; and
    further the first comparator provides the adaptive constant on-time signal at its output terminal.

4. The adaptive constant on-time switching regulator as set forth in claim 3, wherein the first switch and the second switch are turned on and off in complementary fashion.

5. The adaptive constant on-time switching regulator as set forth in claim 1, wherein the voltage feedback circuit comprises:
    a divider, coupled between the output terminal and ground;
    a second comparator, coupled to the divider at its inverting input terminal, operable to provide the feedback signal at its output terminal; and
    a reference, coupled to the non-inverting input terminal of the second comparator.

6. The adaptive constant on-time switching regulator as set forth in claim 1, wherein the minimum off-time control circuit comprises:
    a sawtooth generator, operable to receive the logical signal, and provide a sawtooth signal;
    a third comparator, coupled to the sawtooth generator for receiving the sawtooth signal at its non-inverting input terminal, operable to provide the minimum off-time signal at its output terminal; and
    a second DC supply, coupled to the inverting input terminal of the third comparator.

7. The adaptive constant on-time switching regulator as set forth in claim 1, wherein the logic circuit comprises:

an AND gate, coupled to the feedback circuit at one input terminal, for receiving the feedback signal; coupled to the output of the minimum off-time control circuit at the other input terminal, for receiving the minimum off-time signal; operable to provide an AND signal; and a RS trigger, coupled to the adaptive constant on-time control circuit at its reset terminal, for receiving the adaptive constant on-time signal; coupled to the AND gate, for receiving the AND signal at its set terminal; operable to provide the logical signal at its output terminal.

8. The adaptive constant on-time switching regulator as set forth in claim 1, wherein the reverse current compare circuit comprises a fourth comparator.

* * * * *